(12) United States Patent
Kolar et al.

(10) Patent No.: US 10,547,518 B2
(45) Date of Patent: Jan. 28, 2020

(54) DETECTING TRANSIENT VS. PERPETUAL NETWORK BEHAVIORAL PATTERNS USING MACHINE LEARNING

(71) Applicant: Cisco Technology, Inc., San Jose, CA (US)

(72) Inventors: Vinay Kumar Kolar, San Jose, CA (US); Jean-Philippe Vasseur, Saint Martin d'uriage (FR); Vikram Kumaran, Cary, NC (US); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 69 days.

(21) Appl. No.: 15/880,600

(22) Filed: Jan. 26, 2018

(65) Prior Publication Data
US 2019/0238421 A1    Aug. 1, 2019

(51) Int. Cl.
*G06F 15/173* (2006.01)
*H04L 12/24* (2006.01)
*H04L 12/26* (2006.01)
*G06N 20/00* (2019.01)

(52) U.S. Cl.
CPC .......... *H04L 41/147* (2013.01); *G06N 20/00* (2019.01); *H04L 41/5009* (2013.01); *H04L 41/5025* (2013.01); *H04L 43/08* (2013.01)

(58) Field of Classification Search
CPC ............. H04L 41/147; H04L 41/5009; H04L 41/5025; H04L 43/08; G06N 20/00
USPC ................................................. 709/223, 224
See application file for complete search history.

(56) References Cited

U.S. PATENT DOCUMENTS

| 2010/0071061 A1* | 3/2010 | Crovella ............... H04L 43/022 726/23 |
| 2011/0119374 A1* | 5/2011 | Ruhl ....................... G06Q 10/06 709/224 |
| 2011/0119375 A1 | 5/2011 | Beeco et al. |
| 2011/0149745 A1* | 6/2011 | Filho ................... H04L 63/1416 370/242 |

(Continued)

OTHER PUBLICATIONS

González et al. "Root Cause Analysis of Network Failures Using Machine Learning and Summarization Techniques" IEEE Communications Magazine, Sep. 2017; pp. 1-6.

(Continued)

*Primary Examiner* — Philip B Tran
(74) *Attorney, Agent, or Firm* — Behmke Innovation Group LLC; James Behmke; Stephen D. LeBarron

(57) ABSTRACT

In one embodiment, a network assurance service that monitors a network detects a pattern of network measurements from the network that are associated with a particular network problem. The network assurance service tracks characteristics of the detected pattern over time. The network assurance service uses the tracked characteristics of the detected pattern over time as input to a machine learning-based pattern analyzer. The pattern analyzer is configured to determine whether the detected pattern is a perpetual or transient pattern in the network, and the pattern analyzer is further configured to detect anomalies in the characteristics of the pattern. The network assurance service initiates a change to the network based on an output of the machine learning-based pattern analyzer.

20 Claims, 10 Drawing Sheets

(56) References Cited

U.S. PATENT DOCUMENTS

| | | | |
|---|---|---|---|
| 2014/0165195 A1* | 6/2014 | Brdiczka | G06F 21/552 |
| | | | 726/23 |
| 2015/0128263 A1* | 5/2015 | Raugas | H04L 63/1408 |
| | | | 726/23 |
| 2015/0135012 A1 | 5/2015 | Bhalla et al. | |
| 2015/0229661 A1 | 8/2015 | Balabine et al. | |
| 2016/0065604 A1* | 3/2016 | Chen | H04L 63/1425 |
| | | | 726/23 |
| 2016/0254944 A1* | 9/2016 | Larsson | H04L 63/1425 |
| | | | 370/230 |
| 2016/0350194 A1 | 12/2016 | Mohan et al. | |
| 2017/0019291 A1 | 1/2017 | Tapia et al. | |
| 2017/0024662 A1 | 1/2017 | Warn et al. | |
| 2017/0063905 A1 | 3/2017 | Muddu et al. | |

OTHER PUBLICATIONS

HHS Public Access; Author manuscript Knowl Inf Syst. Author manuscript; available in PMC 2017 Jun. 08; A Survey of Methods for Time Series Change Point Detection; pp. 1-35.

* cited by examiner

DETECTING TRANSIENT VS. PERPETUAL NETWORK BEHAVIORAL PATTERNS USING MACHINE LEARNING

TECHNICAL FIELD

The present disclosure relates generally to computer networks, and, more particularly, to detecting transient versus perpetual network behavioral patterns using machine learning.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
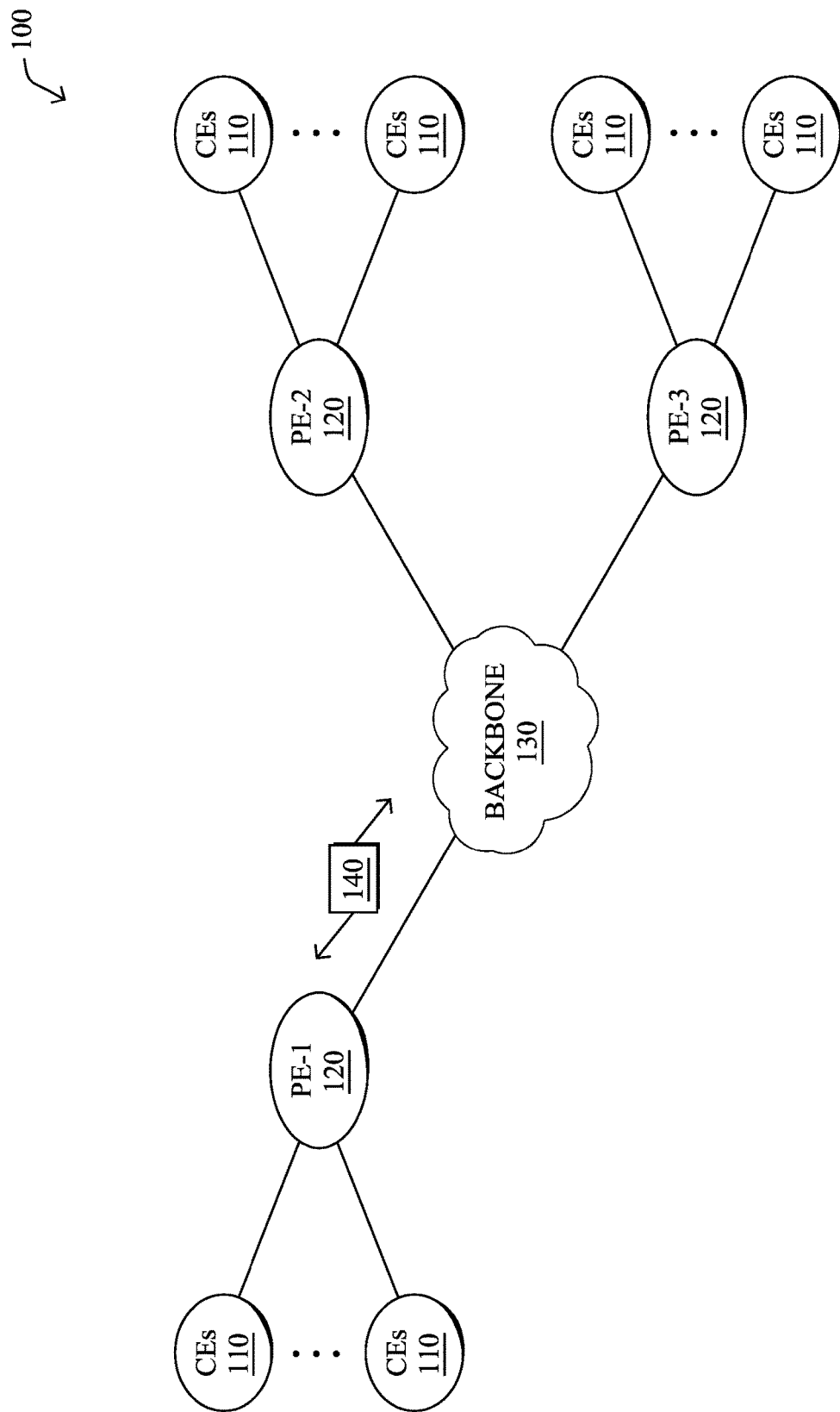
FIGS. 1A-1B illustrate an example communication network.

According to one or more embodiments of the disclosure, a network assurance service that monitors a network detects a pattern of network measurements from the network that are associated with a particular network problem. The network assurance service tracks characteristics of the detected pattern over time. The network assurance service uses the tracked characteristics of the detected pattern over time as input to a machine learning-based pattern analyzer. The pattern analyzer is configured to determine whether the detected pattern is a perpetual or transient pattern in the network, and the pattern analyzer is further configured to detect anomalies in the characteristics of the pattern. The network assurance service initiates a change to the network based on an output of the machine learning-based pattern analyzer.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
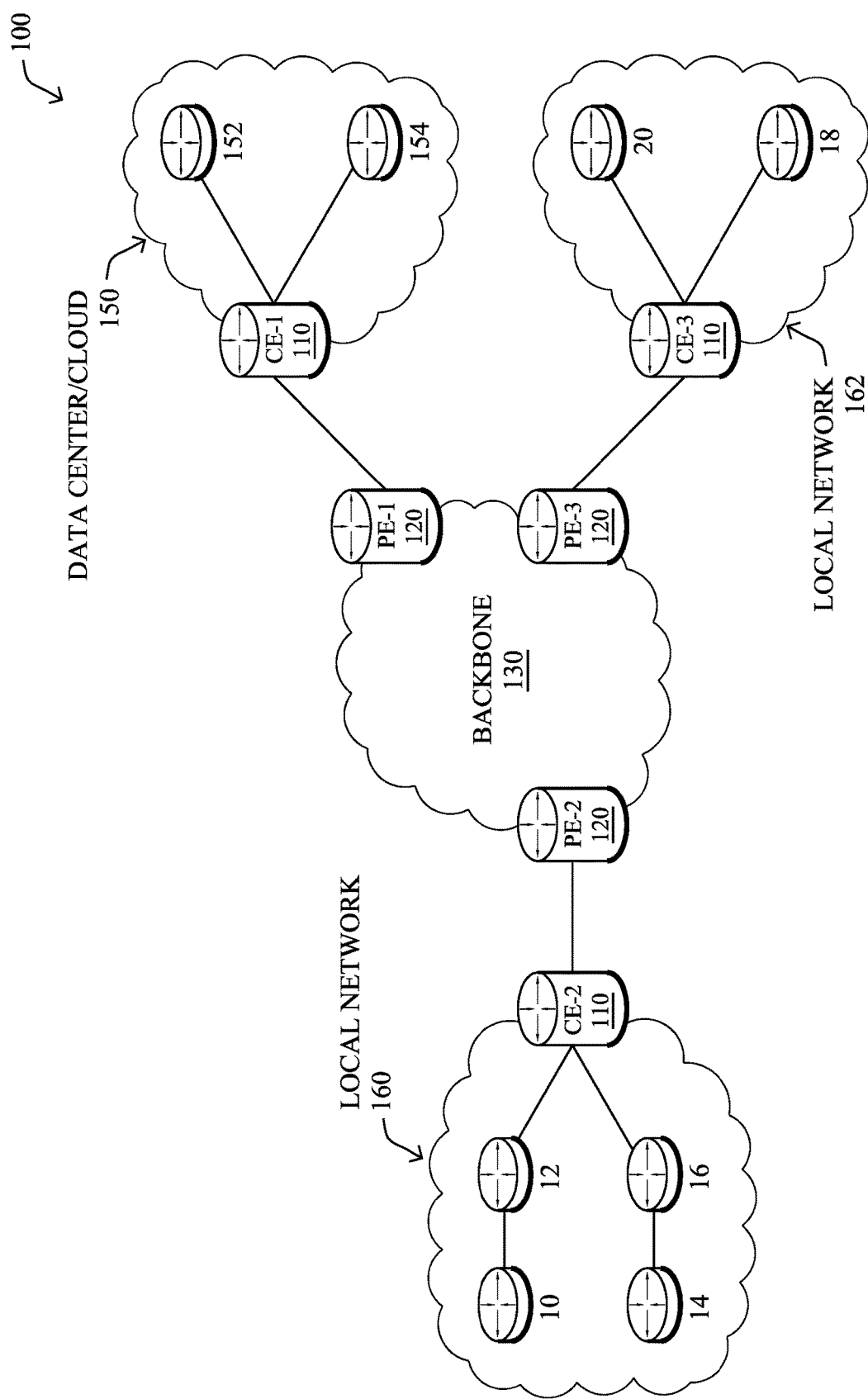

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
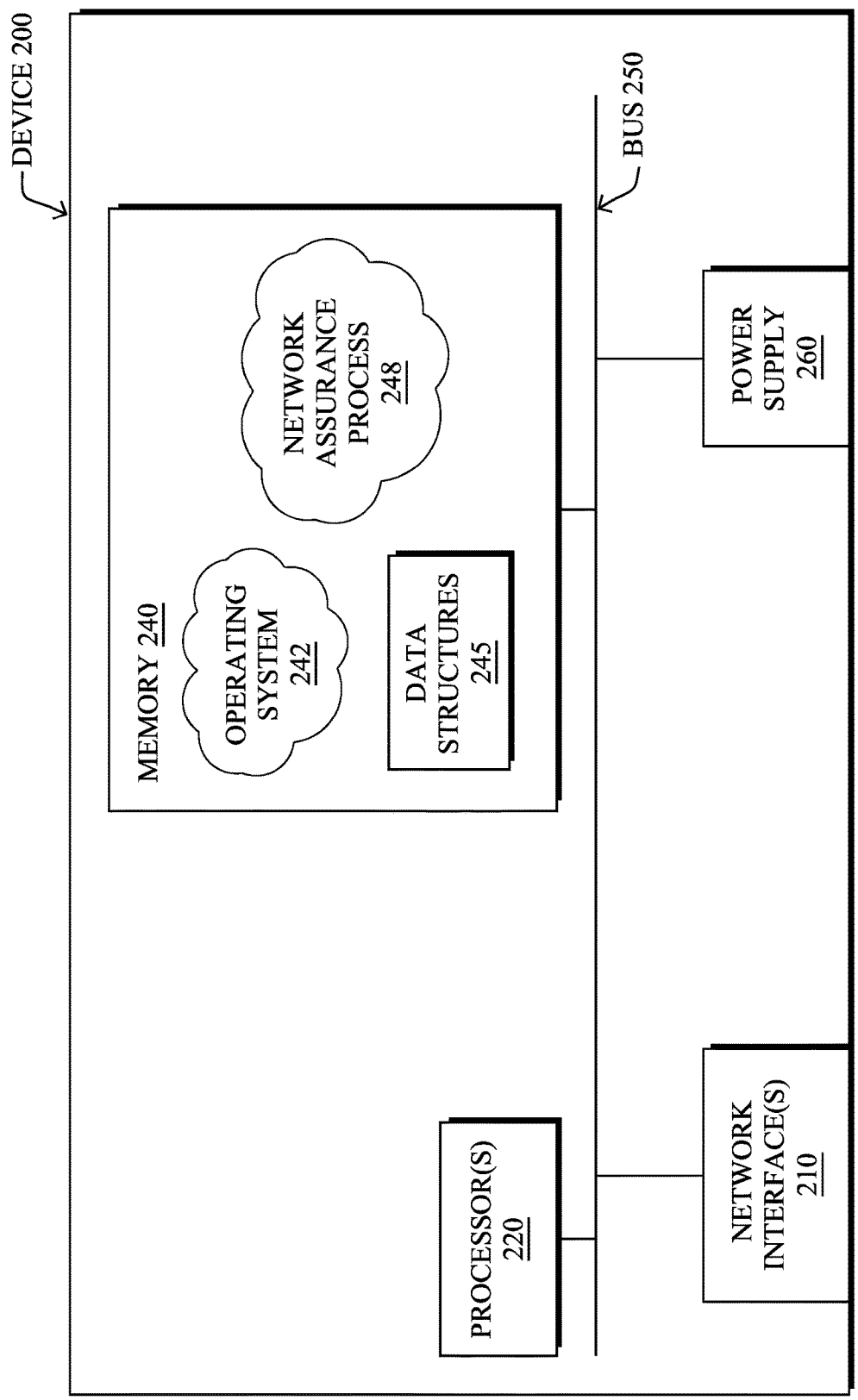
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
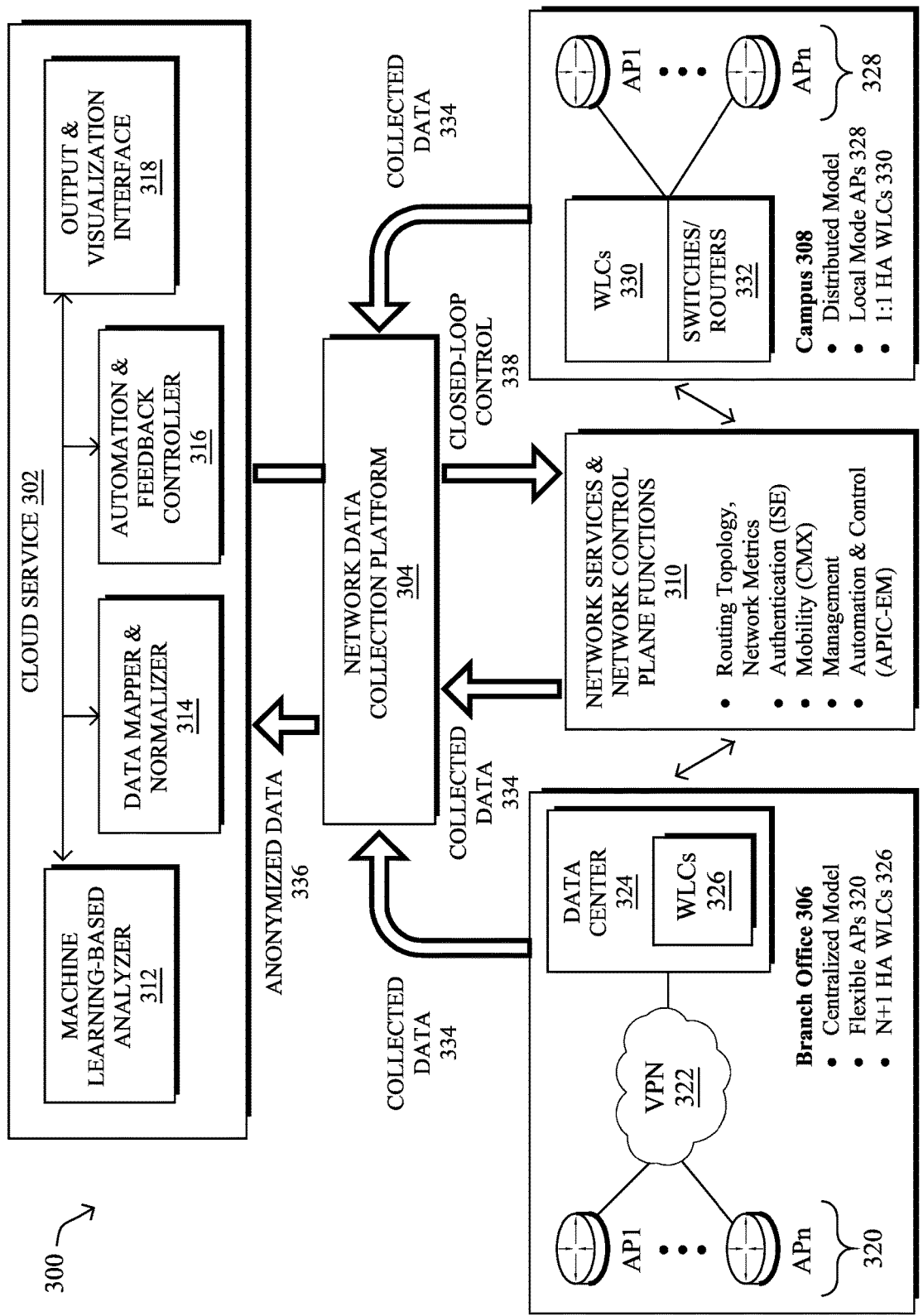
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, networks are inherently complex, distributed systems where multiple network devices and protocols interact with one another. The network assurance techniques described above use machine-learning to analyze the measurement data from the monitored network (e.g., JSON files from controllers, Netflow or IPFIX data, etc.), and provide cognitive insights that aid to troubleshoot complex network problems such as low-throughput or high-packet error events. To do so, the network assurance system may use a two-fold approach to deliver cognitive insights: 1.) extract the main patterns that are causing network problems, and 2.) communicate the patterns in a simple and interpretable manner, so that corrective changes can be made to the network based on the garnered insights.

Patterns of network measurements themselves may have various characteristics, such as their changes over time, how they affect the network, how closely they are indicative of a network problem, etc. For example, some patterns may be persistent (e.g., occur consistently in the network), while other patterns may be transient (e.g., occur in bursts). Distinguishing between the two allows for corrective measures to be taken at certain times, in the case of transient patterns, and to initiate fixes for persistent patterns.

Detecting Transient Vs. Perpetual Network Behavioral Patterns Using Machine Learning The techniques herein introduce a machine learning system and methods for detecting the evolution of patterns of network measurements over time. In some aspects, the techniques herein are able to track the burstiness of the pattern (e.g., perpetual vs. transient), as well as trends and seasonality of higher level patterns that occur in the network. In further aspects, the techniques herein can also apply anomaly detection to the identified patterns, to anomalies in the pattern occurrences.

Specifically, according to one or more embodiments of the disclosure as described in detail below, a network assurance service that monitors a network detects a pattern of network measurements from the network that are associated with a particular network problem. The network assurance service tracks characteristics of the detected pattern over time. The network assurance service uses the tracked characteristics of the detected pattern over time as input to a machine learning-based pattern analyzer. The pattern analyzer is configured to determine whether the detected pattern is a perpetual or transient pattern in the network, and the pattern analyzer is further configured to detect anomalies in the characteristics of the pattern. The network assurance service initiates a change to the network based on an output of the machine learning-based pattern analyzer.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, one function of the network assurance service described herein is to recognize patterns of network measurements and present them in an interpretable manner. To do so, the network assurance system may use machine learning to assess various sets of network measurements to identify patterns of measurements that co-occur with network problems. Such measurements may include, for example, the number of clients associated with a wireless AP, the wireless channel(s) on which the AP communicates, traffic characteristics in the network (e.g., volume, timing, type, loss, etc.), device configurations, and/or any other information that can be collected regarding the monitored network. Similarly, problems can range from wireless hand-off failures, to packet loss or other interruptions to user traffic, to failures of the network to meet certain service level agreements (SLAs).

Figure 4:
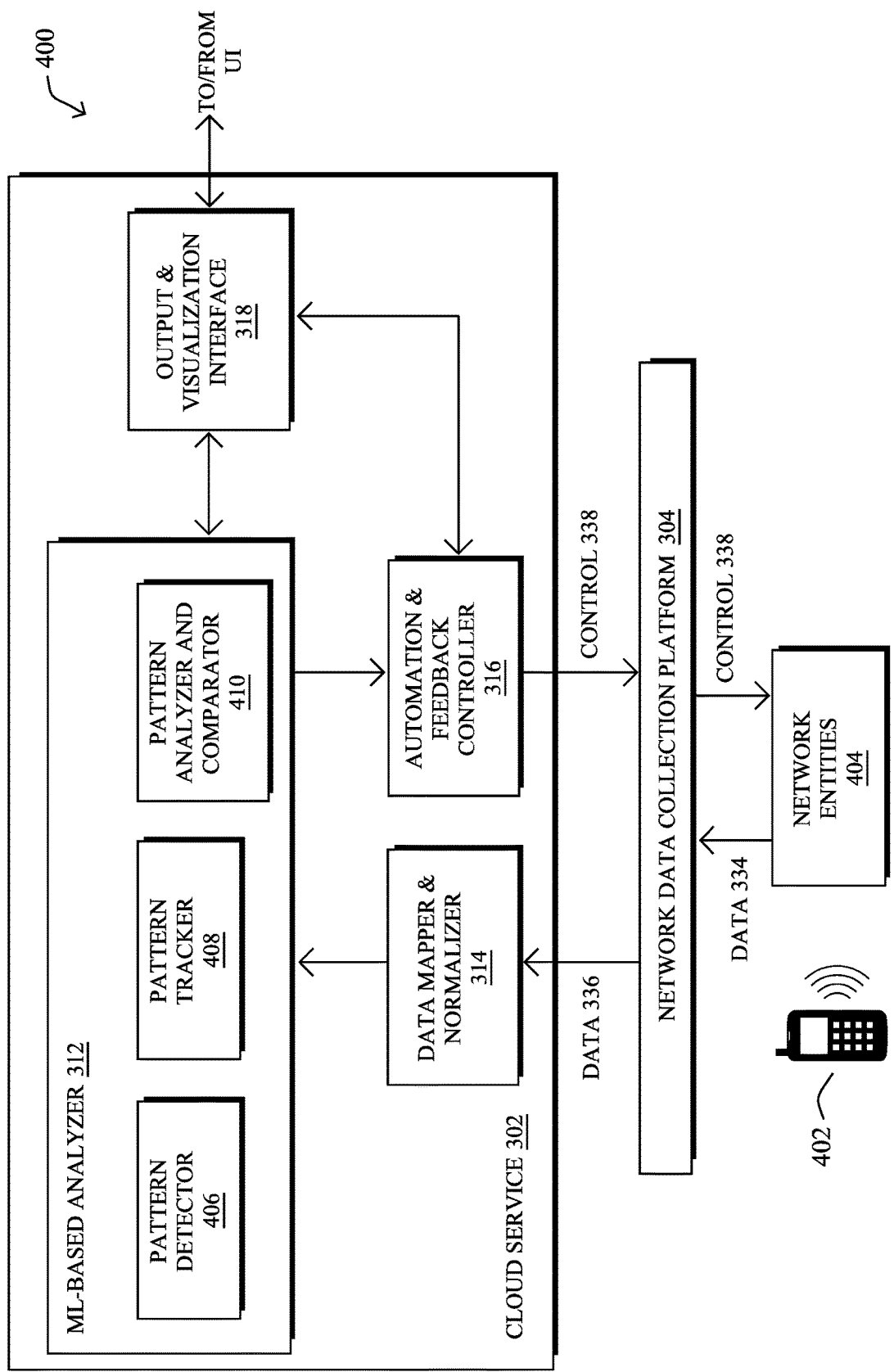
FIG. 4 illustrates an example architecture for detecting transient vs. perpetual network behavioral patterns.

FIG. 4 illustrates an example architecture 400 for detecting transient vs. perpetual network behavioral patterns in a network assurance system, according to various embodiments. At the core of architecture 400 may be the following components: a pattern detector 406, a pattern tracker 408, and a pattern analyzer and comparator 410. In some implementations, the components of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, pattern detector 406 may be configured to detect the most prominent patterns of network measurements (in an interpretable way) that occur in the monitored network for a given timeframe. For example, pattern detector 406 may assess the collected data 336 from the monitored network, to identify a set/pattern of measurements (e.g., characteristics) that co-occur with network problems. The pattern(s) that most frequently co-occur with a particular problem can then be flagged by pattern detector 406 for further analysis.

Figure 5:
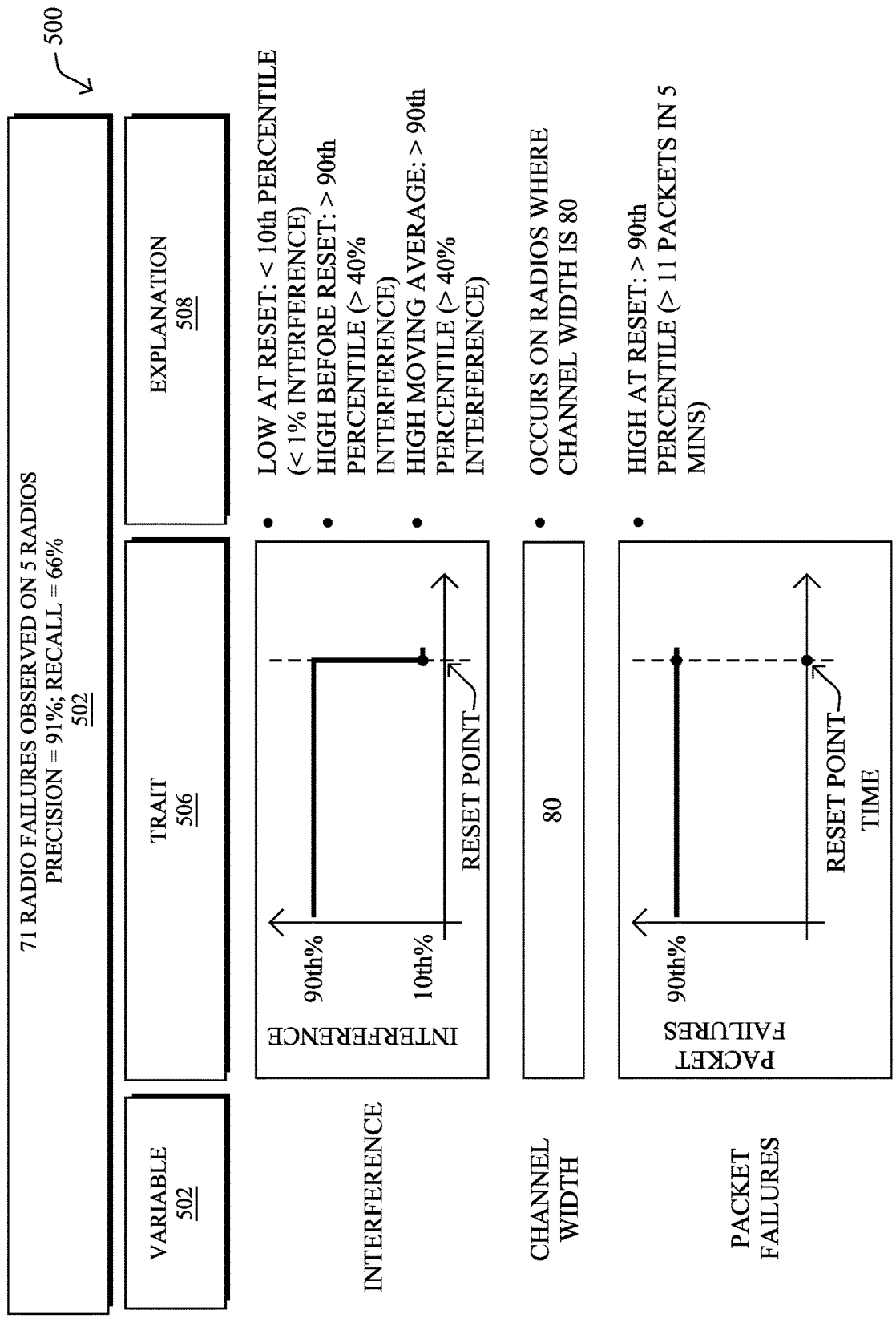
FIG. 5 illustrates an example network insight.

FIG. 5 illustrates an example insight 500, in various embodiments. Assume, for example, that the particular network problem of interest involves radio failures in the wireless network. Pattern detector 406 may assess the pattern(s) of network measurements/characteristics that frequently are present when these radio failures occur. In turn, pattern detector 406 may output insight 500 regarding the failure condition. For example, pattern detector 406 may provide insight 500 to output and visualization interface 318 for output to a user interface (UI) for review by an administrator.

As shown, insight 500 may indicate the associated network problem 502, such as the network assurance system detecting seventy one radio failures five radios in the network. In addition, insight 500 may indicate the variables/measurements 504 and their traits 506 that are frequently observed with these failures. An explanation 508 for each trait 506 can also be included in insight 500, to aid an administrator in interpreting the results. For example, one pattern that may emerge is that the radio failures typically occur on radios having a channel width of 80. Another pattern may indicate that radio interference experienced by the radios is typically very high (e.g., >40%, $90^{th}$ percentile) until a radio reset occurs. Similarly, the packet failures of the radios may also be quite high (e.g., >100 packets in a five minute window, $90^{th}$ percentile) until a radio reset occurs. Taken together, these traits form the pattern of measurements that are most associated with the problems.

Referring again to FIG. 4, pattern tracker 408 may be responsible for tracking the evolution of the patterns over time. This novel component observes several features of the patterns identified by pattern detector 406. In one embodiment, the pattern tracker 408 maintains the information about the different pattern characteristics, such as how many devices were affected by the pattern, what was the precision, recall, number of true positives, false positives, etc., of the pattern with relation to a given network problem. For example, pattern tracker 408 may convey these characteristics as part of insight 500 in FIG. 5. For example, insight 500 may indicate that the pattern predicts a radio failure with a 91% precision and 66% recall.

The third component of the system is pattern analyzer and comparator 410, which analyzes a single or a set of patterns, and provides valuable insights about the pattern evolution. In various embodiments, pattern analyzer and comparator 410 utilizes machine learning, to detect the changes in the evolution of the pattern. In one embodiment, pattern tracker 408 may generate a set of time series for the measurements/characteristics of the pattern. In turn, pattern analyzer and comparator 410 may use machine learning to analyze and compare these time series, to learn how these characteristics evolve over time.

According to various embodiments, pattern analyzer and comparator 410 may be configured to identify any or all of the following:

1. Pattern Trends—e.g., how the pattern is evolving over time
2. Pattern Seasonality—e.g., whether the pattern is persistent or transient 3. Pattern Change Points—e.g., points in time where the pattern characteristics, such as the number of entities affected by the pattern, drastically departs from historical trends.
4. Pattern Anomalies: pattern analyzer and comparator 410 may also apply a machine learning-based anomaly detector to the characteristics of the pattern, to detect unusual changes in the behavior of the pattern. For example, such an anomaly may detect an unusual spike in the number of clients affected by the problem associated with the pattern.

Figure 6:
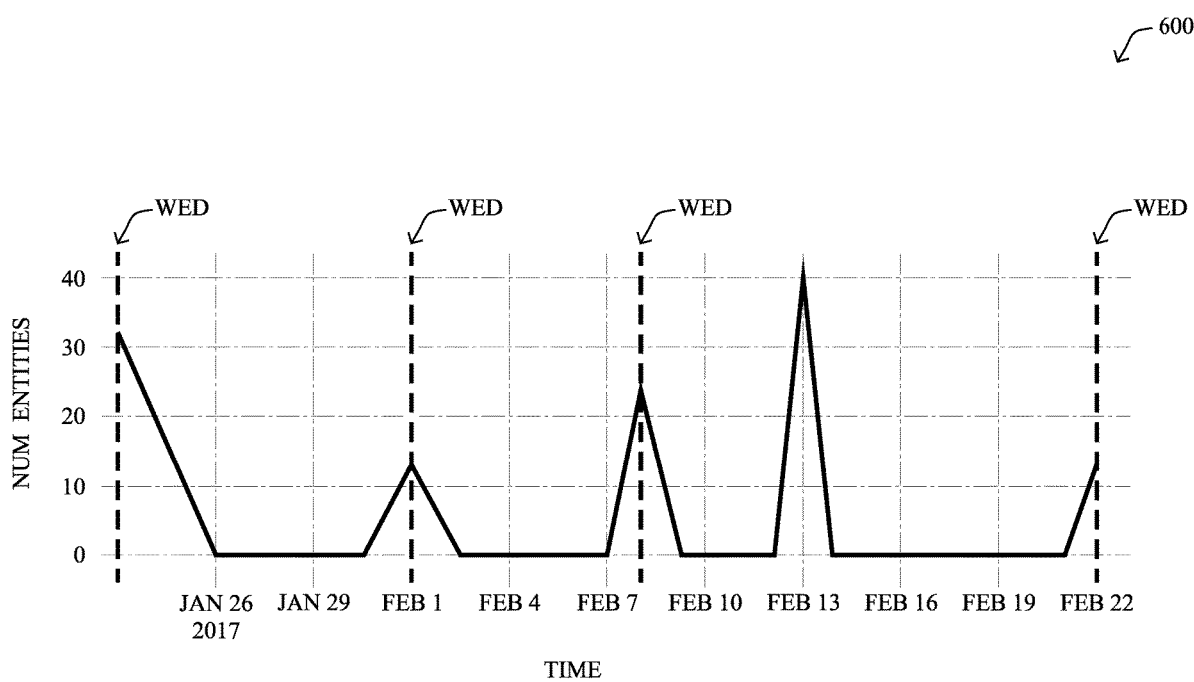
FIG. 6 illustrates the tracking of a network behavioral pattern over time.

FIG. 6 illustrates the tracking of a network behavioral pattern over time, according to various embodiments. As shown, plot 600 shows the number of clients/entities affected by a certain behavioral pattern over the course of time. For example, the pattern may be associated with radio resets in the network. Through analysis of this time series, pattern analyzer and comparator 410 may determine that the pattern is transient and typically occurs on Wednesdays. In addition, pattern analyzer and comparator 410 may also detect anomalies, such as an anomalous spike in the number of affected clients that occurs on Feb. 13, 2017, which is a Monday.

Figure 7A:
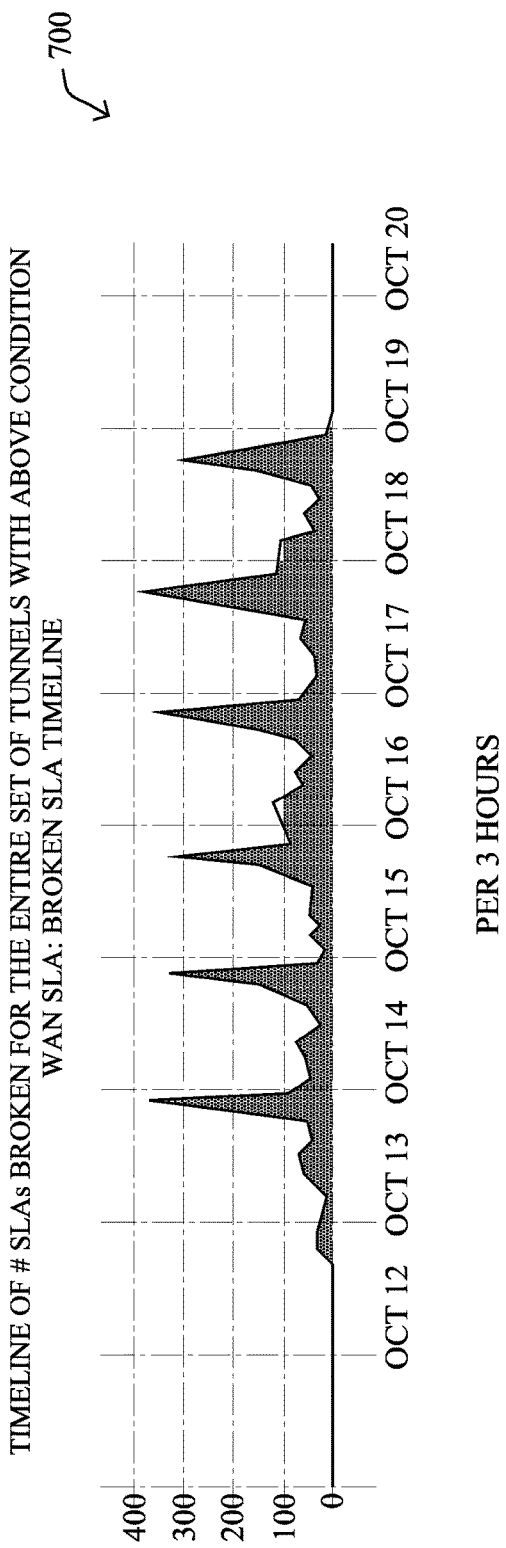
FIGS. 7A-7B illustrate transient and perpetual network behavioral patterns.
Figure 7B:
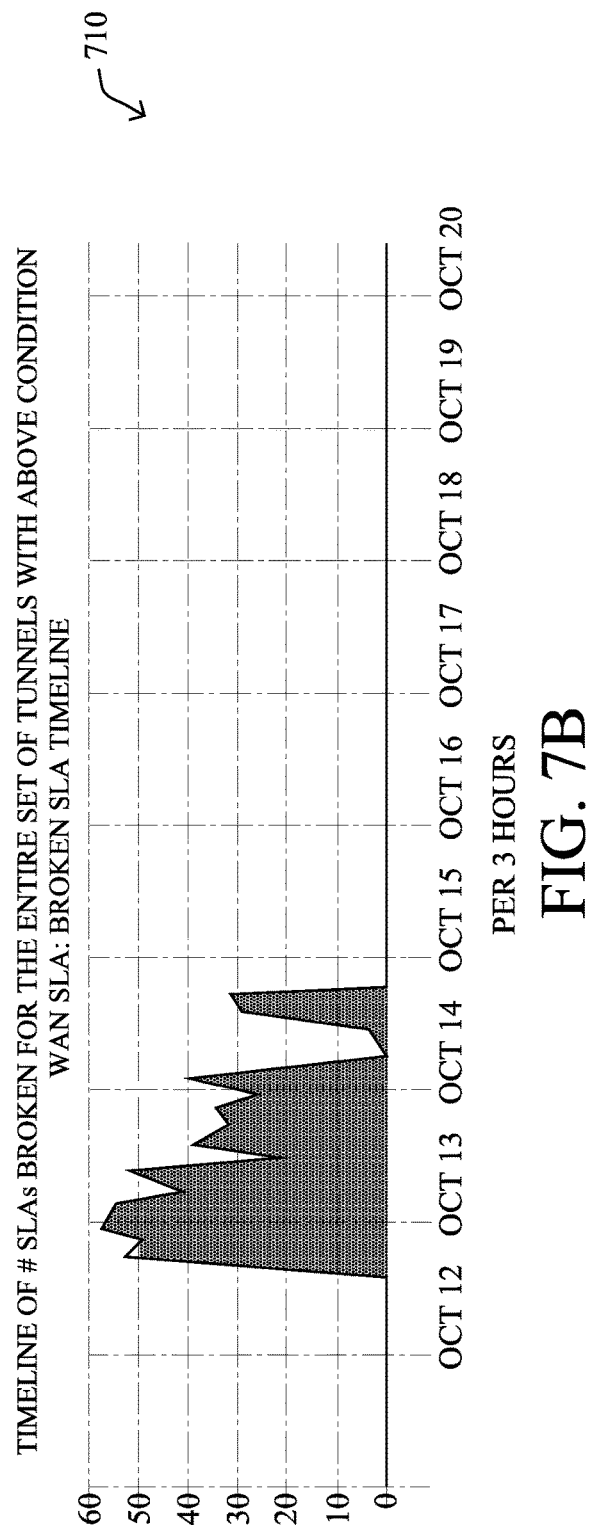

FIGS. 7A-7B illustrate transient and perpetual network behavioral patterns, in further embodiments. In another example in a completely different use-case, two prominent patterns are shown for a Wired Local Area Network (LAN). Here, the first pattern 700 in FIG. 7A has a bursty behavior, while the second pattern 710 in FIG. 7B has a perpetual behavior.

The data assessed by the network assurance system consists of IP-tunnels used between different data-centers and offices spread over the world. The operator of the tunnels had a pre-established contract with its ISP about meeting certain SLAs, such as packet loss and latency being lower than certain threshold. During analysis, the number of times the SLA was violated across different tunnels was counted, and prominent patterns which lead to the SLA violations were extracted. This led to two prominent patterns emerging.

The first pattern identified for the situation shown in FIG. 7A had the following measurements: remoteCarrier=Unknown; localCarrier=C Corp.; tunnelType=bizInternet. From a network problem standpoint, many SLAs were observed as being violated on biz-internet tunnels (as opposed to other type of tunnel called MPLS) when the local ISP is C Corp, and the remote carrier was not known. As shown, pattern 700 demonstrates that the SLA violations had very good seasonality and was prominent across a long period of measurements.

The second pattern identified for the situation shown in FIG. 7B had the following measurements: localCarrier=city; tunnelType=biz-internet. Here, the pattern 710 indicates that the localCarrier, "city," has several SLA violations for the internet tunnel. However, unlike the first pattern in FIG. 7A, pattern 710 is not perpetual. In contrast, it has a transient pattern between October $13^{th}$ and October $19^{th}$.

Figure 8:
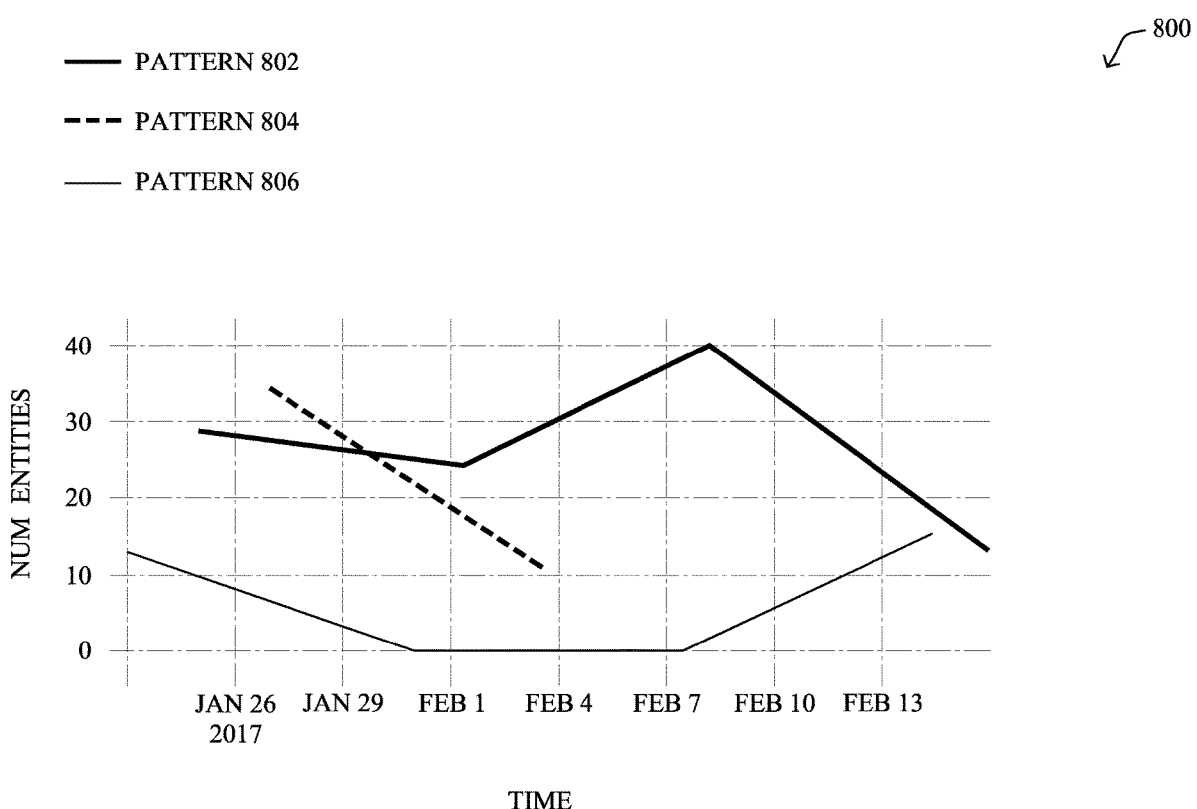
FIG. 8 illustrates a plot of network behavioral patterns over time.

The techniques herein can also enable a network administrator to compare the severity and impact of several patterns over time. For example, FIG. 8 illustrates a plot of network behavioral patterns over time for three patterns 802-806 for radio failures in the Wireless LAN scenario. More specifically, pattern 802 had the following measurements: ['event_rr,' 'interferenceDiff_Io,' 'interference_Io,' 'channelWidth_80,' 'priorityQSent_hi,' 'model_AIR-CAP3702I-A-K9']. Pattern 804 shown had the following measurements: ['event_rr,' 'interferenceDiff_Io,' 'interference_Io,' 'priorityQSent_hi,' 'model_AIR-CAP3702I-A-K9']. Finally, pattern 806 had the following measurements: ['event_rr,' 'interferenceDiff_Io,' 'interference_Io,' 'interferenceMa_hi,' 'priorityQSent_hi,' 'model_AIR-CAP3702I-A-K9'].

As shown, pattern 802 is a perpetual pattern that usually affects 30-40 clients, except for the last week. However, pattern 806 is transient and impacts a much lower number of clients (e.g., 10-20). Finally, pattern 804 is even more transient, but affects a higher number of affected clients (e.g., 10-40).

In some embodiments, the techniques herein can also be used by the network assurance system to compare patterns across different monitored networks. For example, the system can compare and point out that 90% of the different networks have the same perpetual or transient pattern. This information can then be used to determine the appropriate corrective measures.

Figure 9:
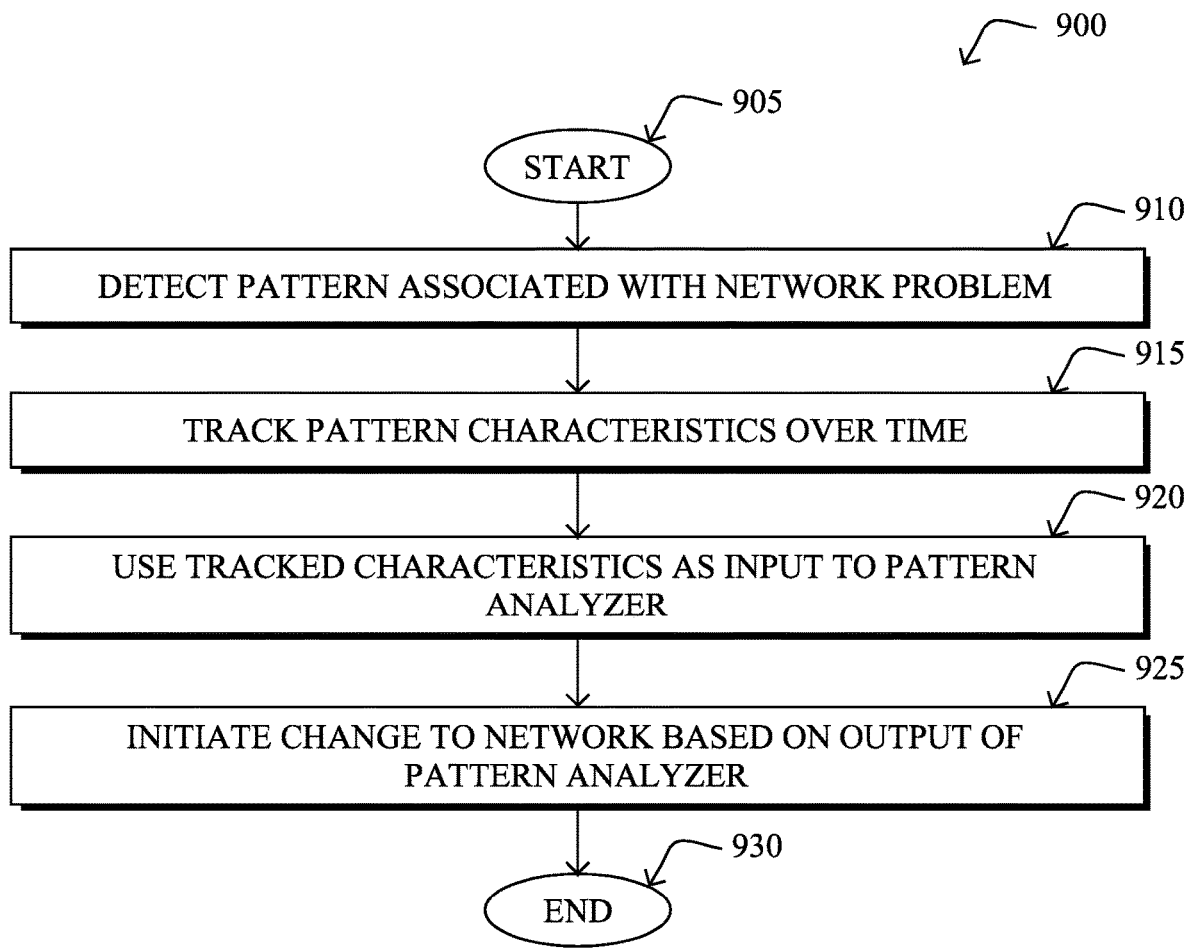
FIG. 9 illustrates an example simplified procedure for detecting transient vs. perpetual network behavioral patterns using machine learning.

FIG. 9 illustrates an example simplified procedure for detecting transient vs. perpetual network behavioral patterns using machine learning, in accordance with one or more embodiments described herein. For example, a non-generic, specifically configured device (e.g., device 200) may perform procedure 900 by executing stored instructions (e.g., process 248), to implement a network assurance service to monitor the network. The procedure 900 may start at step 905, and continues to step 910, where, as described in greater detail above, the network assurance system may detect a pattern of network measurements from the network that are associated with a particular network problem. For example, assume that the problem is the occurrence of radio failures in the network. Surrounding these failures may be any number of co-occurring measurements, such as interference, channel width, packet failures, and the like.

At step 915, as detailed above, the network assurance service may track characteristics of the detected pattern over time. In various embodiments, these characteristics may be indicative of the number of clients affected by the network problem. In further embodiments, the characteristics may be indicative of how well the pattern predicts the particular network problem and comprises at least one of: a precision, a recall, a number of true positives, or a number of false positives, of the prediction.

At step 920, the network assurance service may use the tracked characteristics of the detected pattern over time as input to a machine learning-based pattern analyzer, as described in greater detail above. Various outputs for the analyzer are possible, in various embodiments. In some embodiments, the pattern analyzer is configured to determine whether the detected pattern is a perpetual or transient pattern in the network. In further embodiments, the pattern analyzer is further configured to detect anomalies in the characteristics of the pattern. In yet another embodiment, the pattern analyzer may be further configured to detect change points at which the pattern of network measurements depart from historical trends.

At step 925, as detailed above, the network assurance service may initiate a change to the network based on an output of the machine learning-based pattern analyzer. For example, the change to the network may entail assigning a wireless access point to a different channel, replacing network equipment, adjusting resource reservations in the network to satisfy a service level agreement, or the like. In some embodiments, the service may initiate the change by first providing an indication of the output of the analyzer from step 920 to a user interface, such as for review by a network administrator. In other embodiments, the service may effect the change automatically, such as via automation and feedback controller 316. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of persistent and transient patterns in a network. Such identification allows for corrective measures to be taken, to address network problems associated with the identified patterns.

While there have been shown and described illustrative embodiments that provide for detecting transient vs. perpetual network behavioral patterns using machine learning, it is to be understood that various other adaptations and modifications may be made within the spirit and scope of the embodiments herein. For example, while certain embodiments are described herein with respect to using certain models for purposes of anomaly detection and time series analysis, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a network assurance system that monitors a network, a pattern of network measurements from the network that are associated with a particular network problem;
    tracking, by the network assurance service, characteristics of the detected pattern over time;
    using, by the network assurance service, the tracked characteristics of the detected pattern over time as input to a machine learning-based pattern analyzer, wherein an output of the machine learning-based pattern analyzer characterizes whether the detected pattern is a perpetual or transient pattern in the network;
    determining, by the network assurance service, a change to the network based on whether the detected pattern is a perpetual or transient pattern; and
    initiating, by the network assurance service, the determined change to the network based on an output of the machine learning-based pattern analyzer,
    wherein, when the output of the machine learning-based pattern analyzer characterizes the detected pattern as a transient pattern, the determined change to the network comprises a corrective measure to be taken at certain times according to bursts of the detected pattern.

2. The method as in claim 1, wherein the change to the network comprises at least one of: assigning a wireless access point to a different channel, replacing network equipment, or adjusting resource reservations in the network to satisfy a service level agreement.

3. The method as in claim 1, wherein the characteristics of the detected pattern are indicative of a number of clients affected by the network problem.

4. The method as in claim 1, wherein the characteristics of the detected patterns are indicative of how well the pattern predicts the particular network problem and comprises at least one of: a precision, a recall, a number of true positives, or a number of false positives, of the prediction.

5. The method as in claim 1, wherein the machine learning-based pattern analyzer is further configured to detect change points at which the pattern of network measurements depart from historical trends.

6. The method as in claim 1, wherein the machine learning-based pattern analyzer comprises a set of time series analyzers.

7. The method as in claim 1, further comprising:
    determining, by the network assurance service, whether the pattern of network measurements were observed in one or more other networks.

8. The method as in claim 1, further comprising:
    providing, by the network assurance service, display data indicative of the output of the machine learning-based pattern analyzer to a user interface.

9. An apparatus, comprising:
    one or more network interfaces to communicate with a network;
    a processor coupled to the network interfaces and configured to execute one or more processes; and
    a memory configured to store a process executable by the processor, the process when executed configured to:
        detect a pattern of network measurements from the network that are associated with a particular network problem;
        track characteristics of the detected pattern over time;
        use the tracked characteristics of the detected pattern over time as input to a machine learning-based pattern analyzer, wherein an output of the machine learning-based pattern analyzer characterizes whether the detected pattern is a perpetual or transient pattern in the network;
        determine a change to the network based on whether the detected pattern is a perpetual or transient pattern; and
        initiate the determined change to the network based on an output of the machine learning-based pattern analyzer,
    wherein, when the output of the machine learning-based pattern analyzer characterizes the detected pattern as a transient pattern, the determined change to the network comprises a corrective measure to be taken at certain times according to bursts of the detected pattern.

10. The apparatus as in claim 9, wherein the change to the network comprises at least one of: assigning a wireless access point to a different channel, replacing network equipment, or adjusting resource reservations in the network to satisfy a service level agreement.

11. The apparatus as in claim 9, wherein the characteristics of the detected pattern are indicative of a number of clients affected by the network problem.

12. The apparatus as in claim 9, wherein the characteristics of the detected patterns are indicative of how well the pattern predicts the particular network problem and comprises at least one of: a precision, a recall, a number of true positives, or a number of false positives, of the prediction.

13. The apparatus as in claim 9, wherein the machine learning-based pattern analyzer is further configured to detect change points at which the pattern of network measurements depart from historical trends.

14. The apparatus as in claim 9, wherein the machine learning-based pattern analyzer comprises a set of time series analyzers.

15. The apparatus as in claim 9, wherein the process when executed is further configured to:
    determine whether the pattern of network measurements were observed in one or more other networks.

16. The apparatus as in claim 9, wherein the process when executed is further configured to:
    provide data indicative of the output of the machine learning-based pattern analyzer to a user interface.

17. A tangible, non-transitory, computer-readable medium storing program instructions that cause a network assurance service that monitors a network to execute a process comprising:
    detecting, by the network assurance service, a pattern of network measurements from the network that are associated with a particular network problem;
    tracking, by the network assurance service, characteristics of the detected pattern over time;
    using, by the network assurance service, the tracked characteristics of the detected pattern over time as input to a machine learning-based pattern analyzer, wherein an output of the machine learning-based pattern analyzer characterizes whether the detected pattern is a perpetual or transient pattern in the network;
    determining, by the network assurance service, a change to the network based on whether the detected pattern is a perpetual or transient pattern; and
    initiating, by the network assurance service, the determined change to the network based on an output of the machine learning-based pattern analyzer,
    wherein, when the output of the machine learning-based pattern analyzer characterizes the detected pattern as a transient pattern, the determined change to the network comprises a corrective measure to be taken at certain times according to bursts of the detected pattern.

18. The computer-readable medium as in claim 17, wherein the network assurance service comprises a cloud-based service that receives the measurements from the network.

19. The computer-readable medium as in claim 17, wherein the characteristics of the detected pattern are indicative of a number of clients affected by the network problem and indicative of how well the pattern predicts the particular network problem and comprises at least one of: a precision, a recall, a number of true positives, or a number of false positives, of the prediction.

20. The computer-readable medium as in claim 17, wherein the machine learning-based pattern analyzer is further configured to detect change points at which the pattern of network measurements depart from historical trends.

* * * * *